US008833221B2

(12) United States Patent
Tomita et al.

(10) Patent No.: US 8,833,221 B2
(45) Date of Patent: Sep. 16, 2014

(54) ELECTRIC POWER TOOL

(75) Inventors: Akifumi Tomita, Anjo (JP); Yusuke Hirata, Anjo (JP); Shingo Kamiya, Anjo (JP)

(73) Assignee: Makita Corporation, Anjo-Shi (JP)

( * ) Notice: Subject to any disclaimer, the term of this patent is extended or adjusted under 35 U.S.C. 154(b) by 638 days.

(21) Appl. No.: 12/882,642

(22) Filed: Sep. 15, 2010

(65) Prior Publication Data

US 2011/0078910 A1 Apr. 7, 2011

(30) Foreign Application Priority Data

Oct. 5, 2009 (JP) .................................. 2009-231317

(51) Int. Cl.
| | |
|---|---|
| *B27B 17/00* | (2006.01) |
| *H02P 3/12* | (2006.01) |
| *B27B 17/08* | (2006.01) |
| *H02P 3/22* | (2006.01) |
| *H02P 3/16* | (2006.01) |
| *B27G 19/00* | (2006.01) |
| *H02P 3/26* | (2006.01) |

(52) U.S. Cl.
CPC ................ *B27G 19/003* (2013.01); *H02P 3/12* (2013.01); *B27B 17/083* (2013.01); *B27B 17/00* (2013.01); *H02P 3/22* (2013.01); *H02P 3/16* (2013.01); *H02P 3/26* (2013.01)
USPC .................. 83/788; 83/789; 30/382; 173/217

(58) Field of Classification Search
USPC .............. 30/381–387; 83/788, 789, 792, 801, 83/830–834, 522.11, 522.12; 173/2, 4–7, 173/170, 176, 180, 181, 217
See application file for complete search history.

(56) References Cited

U.S. PATENT DOCUMENTS

| | | | |
|---|---|---|---|
| 4,267,914 | A | 5/1981 | Saar |
| 4,543,723 | A | 10/1985 | Bortfeld et al. |
| 4,628,233 | A | 12/1986 | Bradus |
| 4,680,862 | A | 7/1987 | Wieland et al. |

(Continued)

FOREIGN PATENT DOCUMENTS

| | | |
|---|---|---|
| EP | 0 761 398 A1 | 3/1997 |
| EP | 1 066 933 A2 | 1/2001 |

(Continued)

OTHER PUBLICATIONS

Apr. 26, 2012 Partial European Search Report issued in European Patent Application No. EP 10179226.5.

(Continued)

*Primary Examiner* — Phong Nguyen
(74) *Attorney, Agent, or Firm* — Oliff PLC

(57) ABSTRACT

An electric power tool has an electric motor disposed in a main body and a power supply circuit electrically connected to the electric motor by wires to supply electric power to the electric motor. A switch is disposed in the power supply circuit so as to electrically open and close the power supply circuit. A movable member is supported by the main body, a detector is disposed in the main body to detect a movement of the movable member and the switch is configured to electrically open the power supply circuit when the detector detects the movement of the movable member. The wires connected to the electric motor are not connected to the detector so that the length of the wires is shortened.

15 Claims, 6 Drawing Sheets

(56) References Cited

U.S. PATENT DOCUMENTS

| | | |
|---|---|---|
| 6,963,183 B1 | 11/2005 | Kessler et al. |
| 7,023,159 B2 | 4/2006 | Gorti et al. |
| 7,075,257 B2 | 7/2006 | Carrier et al. |
| 7,410,006 B2 | 8/2008 | Zhang et al. |
| 7,552,781 B2 | 6/2009 | Zhang et al. |
| 2004/0207351 A1 | 10/2004 | Hahn et al. |
| 2009/0126962 A1* | 5/2009 | Jung et al. ............ 173/201 |

FOREIGN PATENT DOCUMENTS

| | | |
|---|---|---|
| EP | 1 411 626 A2 | 4/2004 |
| JP | U-57-175702 | 11/1982 |
| JP | A-60-125603 | 7/1985 |
| JP | B2-62-25483 | 6/1987 |
| JP | B2-64-6898 | 2/1989 |
| JP | B2-1-52142 | 11/1989 |
| JP | A-9-65570 | 3/1997 |
| JP | A-9-314482 | 12/1997 |
| JP | B2-2852716 | 2/1999 |
| JP | A-2001-47403 | 2/2001 |
| JP | A-2004-140995 | 5/2004 |
| JP | A-2004-181549 | 7/2004 |
| JP | A-2006-315117 | 11/2006 |
| JP | A-2007-203387 | 8/2007 |
| JP | A-2008-516789 | 5/2008 |
| JP | B2-4129118 | 8/2008 |
| SU | 722760 | 3/1980 |
| WO | WO 2006/045072 A2 | 4/2006 |
| WO | WO 2006/068482 A2 | 6/2006 |

OTHER PUBLICATIONS

Nov. 30, 2012 Extended European Search Report issued in Patent Application No. 10179226.5.

Jul. 30, 2013 Office Action issued in Japanese Patent Application No. 2009-231317 (with translation).

Jul. 11, 2014 Office Action issued in Russian Application No. 2010140630/2(058215) (with English-language translation).

* cited by examiner (a)

(b)

ELECTRIC POWER TOOL

CROSS-REFERENCE TO RELATED APPLICATION

This application claims priority to Japanese Patent Application No. 2009-231317 filed on Oct. 5, 2009, the contents of which are hereby incorporated by reference into the present application.

TECHNICAL FIELD

The present application relates to electric power tools. Especially the present application relates to a technique for braking the electric power tools.

DESCRIPTION OF RELATED ART

An electric power tool drives a tool by an electric motor. When the driven tool comes into contact with a work, the electric power tool may receive a reaction force from the work. An operator is required to hold the electric power tool tightly against the reaction force. However, it may be possible that the reaction force is unexpectedly strong, and the electric power tool changes its position or orientation rapidly against the holding force by the operator.

Japanese Patent Application Publication No. 60-125603 discloses an electric chain saw. The electric chain saw is one of the electric power tools and has a possibility of rapid change of its position or orientation during the use thereof. The electric chain saw is provided with a hand guard arranged proximal to a handle for the operator to hold. The hand guard is movable with respect to a main body of the electric chain saw and moves from a normal position by contacting with the operator's hand holding the handle when the rapid change of the position or orientation of the electric chain saw occurs. When the hand guard is moved from the normal position, the saw chain being driven by the electric motor is mechanically braked. In addition, when the hand guard is moved from the normal position, a switch is turned off, and electric current being supplied to the electric motor is cut off. When the electric chain saw changes its position or orientation rapidly, the saw chain is mechanically braked, and the power supply to the electric motor is stopped. That is, when the electric chain saw changes its position or orientation rapidly, the saw chain is stopped very quickly.

SUMMARY

In the conventional electric chain saw, the switch which is activated by the hand guard is interposed in the middle of electric wires connecting an electric power source and the electric motor. Therefore, the electric wires must be extended to the switch which is arranged proximal to the handle for the operator to hold, which resulted in electric wires' length being elongated. Since a large electric current for driving the electric motor flows through the electric wires, when the electric wires' length is long, the electric wires transmit large electric noise (electromagnetic waves). Due to this, the conventional electric power tools require various anti-noise measures. The various anti-noise measures required for the conventional power tools obstruct the electric power tools from downsizing.

One object of the present application is to develop a technology in which the electric wires connecting the electric power source and the electric motor are not required to reach the switch. Another object of the present application is to develop a technology in which the electric wires connecting the electric power source and the electric motor can be shortened. Yet another object of the present application is to develop a technology in which the various anti-noise measures can be omitted. Still yet another object of the present application is to develop a technology in which electric power tools can be downsized.

In one aspect of the technology disclosed in this application, the electric power tool is preferably provided with a movable member such as the hand guard and a detector to detect a movement of the movable member from the normal position. Also, the electric power tool is provided with a power supply circuit for supplying electric power to the electric motor and a switch electrically open and close the power supply circuit. The switch is coupled to the detector and the power supply circuit is opened by the switch when the movable member is moved from the normal position and the detector detects the movement.

In a preferred embodiment of the present technology, the detector is not connected to the electric wires connecting the electric power source and the electric motor. Instead, the detector is connected to the switch via a signal line. The power supply circuit is opened and the electric power source and the electric motor are disconnected when the switch is opened.

According to the present technology, the electric wires connecting the electric power source and the electric motor are not required to reach the detector, and the electric wires can be shortened. Only a small current passes the signal line coupling the detector and the switch, therefore, the signal line does not transmit the substantial noise. According to the present technology, the electric wires connecting the electric power source and the electric motor, which transmit large electric noise due to large electric current for driving the electric motor can be shortened, and various anti-noise measures can be omitted. The electric power tools can be downsized.

DETAILED DESCRIPTION

Figure 1:
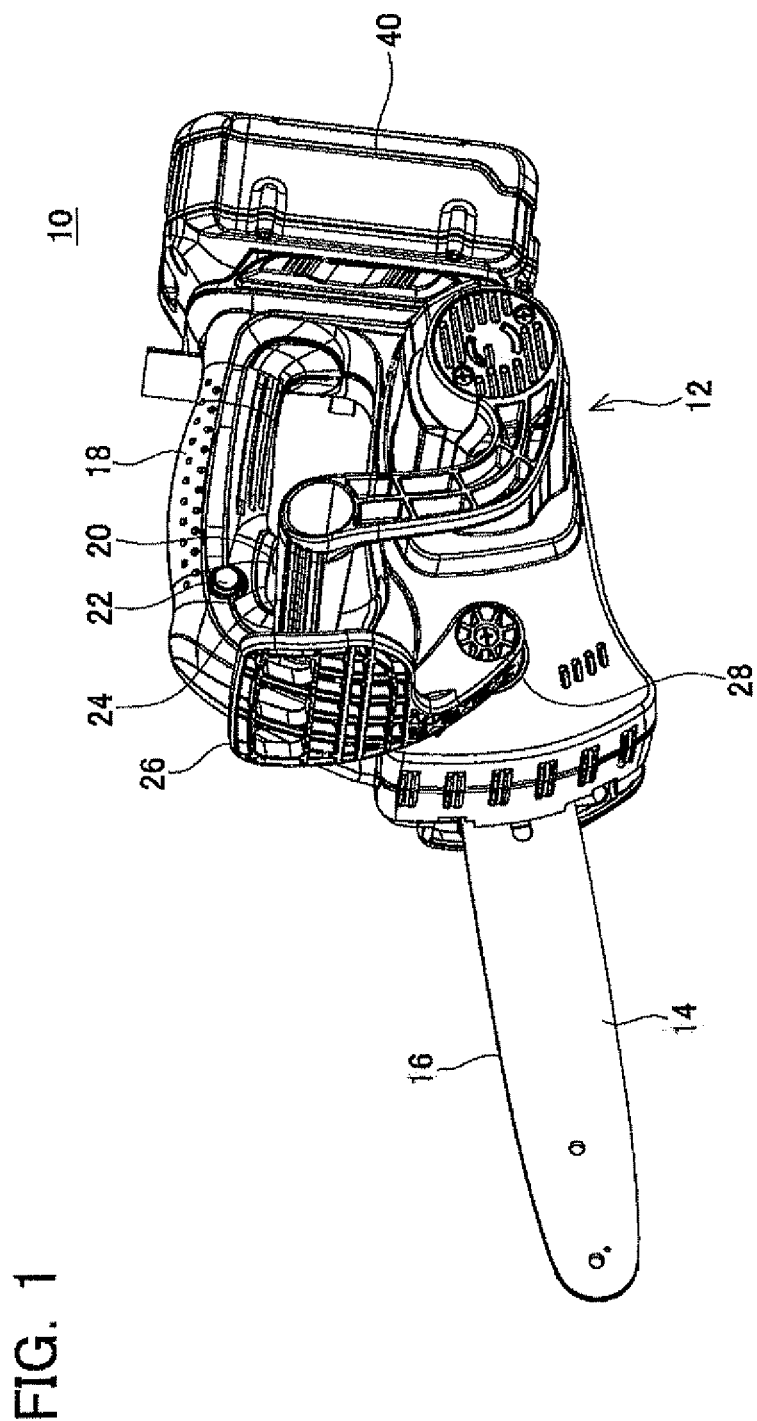
FIG. 1 shows an overview of a chain saw of a first embodiment.

In one embodiment of the present technology, the electric power tool is provided with a controller. The controller is connected to the detector and the switch and interposed between the detector and the switch. The controller may make the switch open when a predetermined signal is transmitted from the detector. The detector is configured to transmit the predetermined signal when the movable member moves from the normal position. The controller may be a microcomputer. The detector and the controller may be connected by thin signal wires, and the controller and the switch may be connected by thin signal wires. Thin signal wires do not obstruct the electric power tools from downsizing.

It is preferable that the detector transmits the predetermined signal when the movable member moves from the normal position.

It is also preferable that the electric power tool is provided with a handle for an operator to hold and the movable member is arranged in a vicinity of the handle. It is preferable that when the electric power tool is rotated around the handle, the movable member is moved from the normal poison by being pushed by the operator's hand holding the handle.

It is preferable that the electric power tool may be a chain saw, and the tool is a saw chain. It should be understood naturally that the electric power tool that can be improved by the present technology is not limited to the chain saw.

The present technology may be adapted to a battery driven cordless power tool (DC type electric power tool) and a power tool driven by commercial electric power via a cord (AC type electric power tool).

The present technology may be adapted to a power tool which includes a mechanical braking device for braking the tool that is activated by the movement of the movable member. The mechanical braking device may be any type of known braking devices. The present technology may be adapted to a power tool which does not include the mechanical braking device.

The switch for closing and opening the power supply circuit may be a switch having contacts or alternatively, a switch having no contact. When semiconductor switch having no contact is adopted, the electric circuit of the electric power tool may be simplified. FET (Field effect transistor) may be used for DC type electric power tool, and TRIAC (triode for alternating current) may be used for AC type electric power tool. These semiconductor switches are reliable for supplying and stopping large current for driving the electric motor.

The present technology may be adapted to a power tool which includes an electric braking circuit of the electric motor that is activated by the movement of the movable member. The electric braking circuit is formed by a circuit that shorts terminals of the electric motor and a switch interposed between the terminals. The switch for closing and opening the power supply circuit is referred to a first switch and the switch for closing and opening the short circuit is referred to a second switch. The first switch opens the power supply circuit and the second switch closes the short circuit when the movable member moves from the normal position. In this embodiment, not only the power supply to the electric motor is stopped, but also the electric motor is braked when the movable member is moved from the normal position.

The second switch may have contacts or alternatively, have no contact. When semiconductor switch having no contact is adopted, the electric circuit of the electric power tool may be simplified.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric power tool.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(Embodiment 1)

FIG. 1 shows an overview of a chain saw 10 in the first embodiment. As shown, a chain saw 10 has a main body 12, a guide bar 14 projecting from the main body 12 and a saw chain 16 wound around the guide bar 14. The chain saw 10 is one example of the electric power tools in which a motor 48 shown in FIG. 2 drives a tool (e.g. the saw chain 16). A plurality of cutting chips is arranged along the saw chain 16, and the saw chain 16 travels along a periphery of the guide bar 14 when the motor 48 rotates. As shown in FIG. 1, a battery pack 40 for supplying electric power to the motor 48 is connected to the main body 12. The battery pack 40 may be separated from the main body 12.

The main body 12 has a main grip 18 and a front handle 24. The operator maintains the position and orientation of the chain saw 10 by griping the main grip 18 by a right hand and holding the front handle 24 by a left hand. The guide bar 14 and the saw chain 16 project forwardly from the main body 12. The main grip 18 extends along a back and forth direction, and the front handle 24 extends along a left and right direction of the operator. The front handle 24 extends in a direction substantially perpendicular to a plane in which the saw chain 16 travels.

A trigger 20 and a lock release button 22 are provided at the main grip 18. The saw chain 16 starts traveling when the trigger 20 is pulled by the operator, and the saw chain 15 stops traveling when the trigger 20 is released by the operator. While the lock release button 22 is at a normal position, the operator can not pull the trigger 20. Only while the lock release button 22 is pulled by the operator, the operator can pull the trigger 20. The lock release button 22 works as a safety device.

Figure 2:
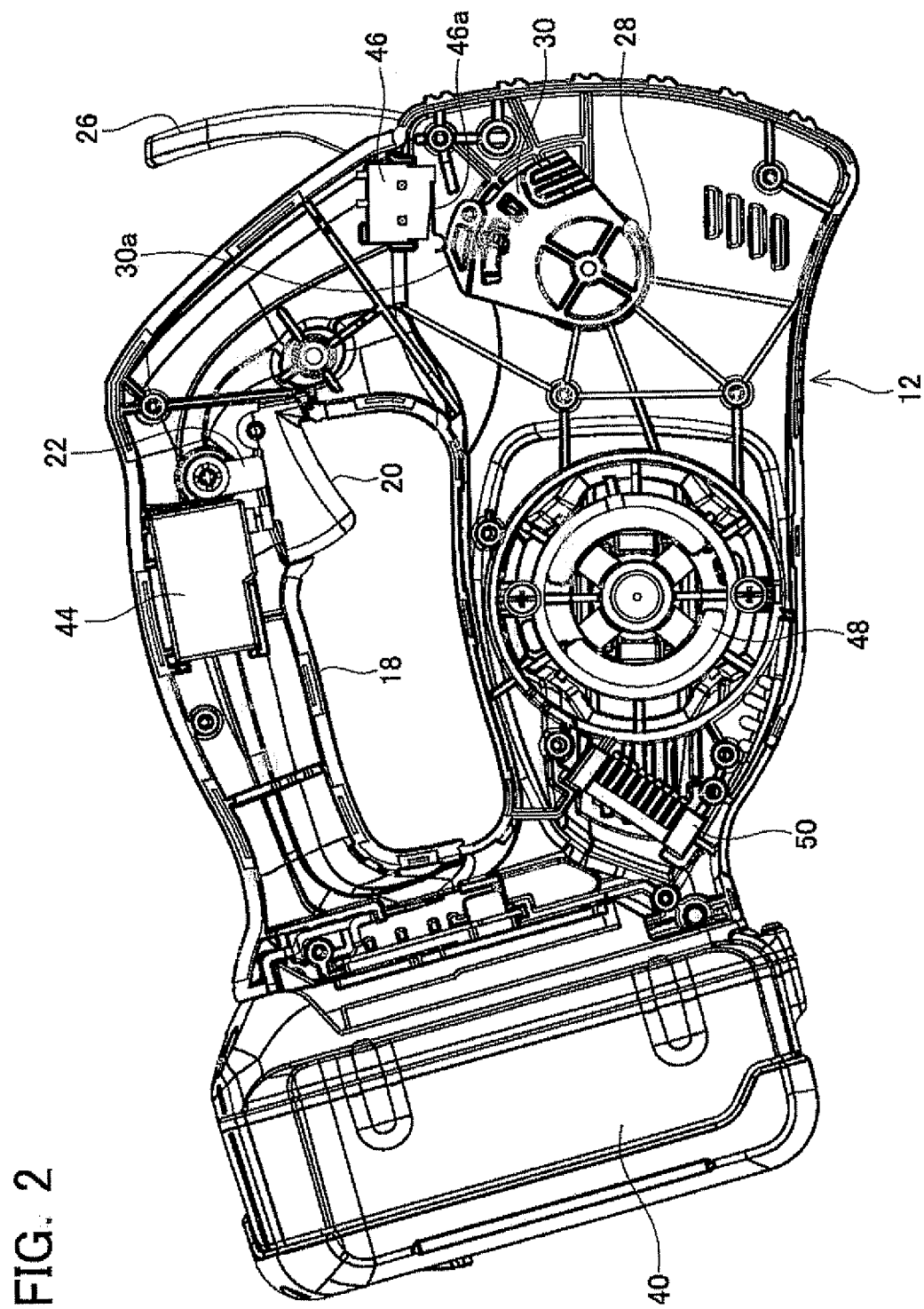
FIG. 2 shows an internal structure of the chain saw.

A hand guard 26 is provided at the main body 12. The hand guard 26 is arranged in the vicinity of the front handle 24 and is located in front of the operator's hand holding the front handle 24 while the chain saw 10 is in the normal operation. This is the normal position of the hand guard 26. FIG. 2 illustrates the hand guard 26 at its normal position. The hand guard 26 has a shaft 28, and can rotate with respect to the main body 12 around the shaft 28. When the guide bar 14 and the saw chain 16 swing upwardly due to the reaction force applied from the work, the operator's hand holding the front handle 24 contacts with the hand guard 26 and pushes the hand guard 26 forwardly (toward the guide bar 14 and in a clockwise direction in FIG. 2). When the hand guard 26 moves forwardly, the movement is detected by a detector which will be explained later.

FIG. 2 shows an internal structure of the main body 12. A main switch 44, a detector 46, the motor 48 and a circuit unit 50 are installed within the main body 12. Each of the main switch 44, the detector 46 and the motor 48 is electrically connected to the circuit unit 50. In addition, the battery pack 40 is also connected to the circuit unit 50 when the battery pack 40 is connected to the main body 12. The main switch 44 is provided at traveling path of the trigger 20. The main switch 44 is turned on and off in accordance a position of the trigger 20. The detector 46 is provided at traveling path of the hand guard 26. The detector 46 is turned on and off in accordance a position or an angle of the hand guard 26. The motor 48 is connected to a sprocket (not shown) for driving the saw chain 16. A speed reducing device and a centrifugal clutch (not shown) are arranged between the motor 48 and the sprocket. The motor 48 is driven by the electric power supplied from the battery pack 40.

As shown in FIG. 2, the hand guard 26 has a portion 30 having a fan shape. The portion 30 rotates around the shaft 28 with the hand guard 26. The portion 30 has an abutting surface 30a on its periphery. The detector 46 has a movable member 46a that abuts against the abutting surface 30a of the hand guard 26. The abutting surface 30a is inclined with respect to a circle around the shaft 28. As shown in FIG. 2, while the hand guard 26 is at its normal position, the movable member 46a is lifted toward the detector 46, and the detector 46 is in an off state. When the hand guard 26 rotates forwardly (clockwise direction) from the normal position shown in FIG. 2, the movable member 46a is pushed away from the detector 46, and the detector 46 shifts to an on state. The detector 46 detects whether the hand guard 26 is at its normal position or moved forwardly from its normal position.

In this embodiment, a switch having a contact is adopted as the detector 46, however, another type of a switch or a sensor, such as an electromagnetic switch or sensor, or an optical switch or sensor may be adopted. Any type of switch or sensor that changes its output depending on its distance from an object may be adopted as the detector. The movable portion 30 is only an example, and the hand guard is not limited to the hand guard 26 in this embodiment.

Although not shown in FIG. 2, a mechanical braking device is installed in the main body 12. The mechanical braking device mechanically brakes the rotation of the sprocket for driving the saw chain 16. The mechanical braking device is activated when the hand guard 26 rotates forwardly from its normal position. Various types of mechanical braking devices are known, and any type of known mechanical braking devices can be adopted.

Figure 3:
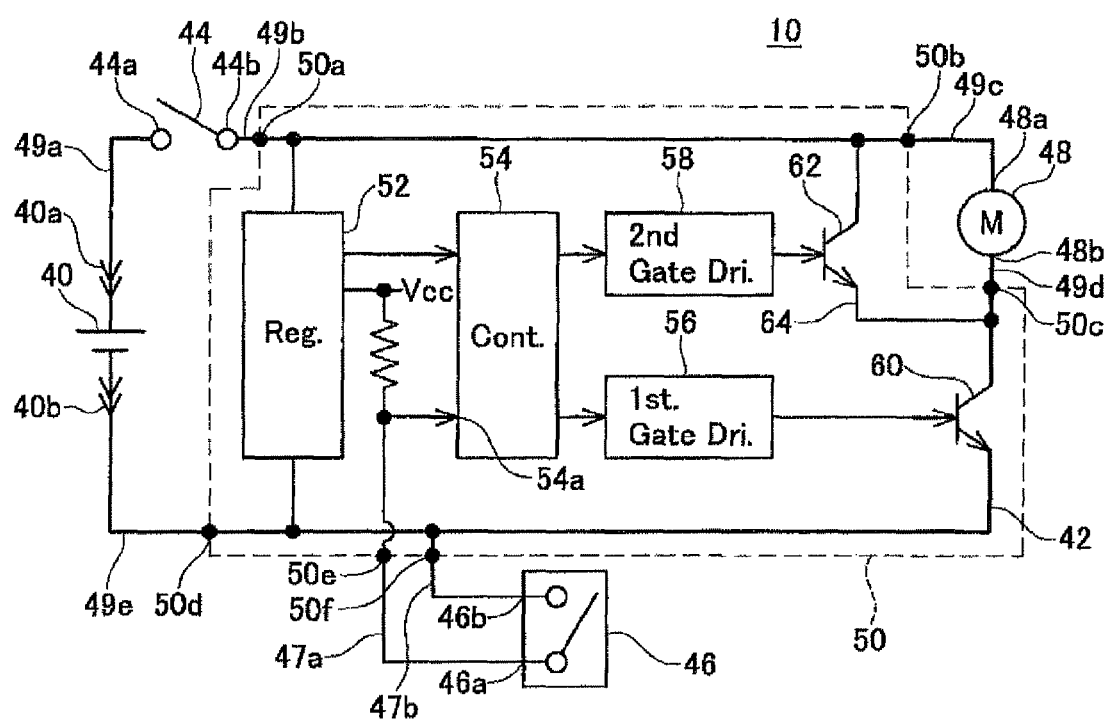
FIG. 3 shows an electric circuit of the chain saw.

FIG. 3 shows an electric circuit of chain saw 10. The motor 48 is electrically connected to a plus terminal 40a and a minus terminal 40b of a power supply circuit 42. When the battery pack 40 is connected to the main body 12, the plus terminal of the battery pack 40 is connected to the plus terminal 40a of the power supply circuit 42, and the minus terminal of the battery pack 40 is connected to the minus terminal 40b of the power supply circuit 42. The power supply circuit 42 is assembled by the main switch 44, the circuit unit 50 and the detector 46. When the battery pack 40 is connected to the main body 12, the motor 48 is connected to the battery pack 40 through the power supply circuit 42. The plus terminal 40a and the first terminal 44a of the main switch 44 are connected by a power line 49a. Similarly, the second terminal 44b of the main switch 44 and the first terminal 50a of the circuit unit 50 are connected by the power line 49b, the second terminal 50b of the circuit unit 50 and a first terminal 48a of the motor 48 are connected by a power line 49c, a second terminal 48b of the motor 48 and a third terminal 50c of the circuit unit 50 are connected by a power line 49d, and the fourth terminal 50d of the circuit unit 50 and the minus terminal 40b are connected by a power line 49e. The power lines 49a, 49b, 49c, 49d, and 49e are thick electric wires that allow large electric current of the driving motor 48 to flow. On the other hand, a fifth terminal 50e of the circuit unit 50 and the first terminal 46a of detector 46 are connected by a signal line 47a. Similarly, a second terminal 46b of detector 46 and a sixth terminal 50f of circuit unit 50 are connected by a signal line 47b. Large electric current of the driving motor 48 does not flow through the signal lines 47a, 47b. The signal lines 47a, 47b are thin electric wires.

The circuit unit 50 has a voltage regulator 52, a controller 54, a first gate driver 56, a second gate driver 58, a first switch 60 and a second switch 62. The battery pack 40, the main switch 44, the motor 48 and the first switch 60 are connected in series to form the power supply circuit 42. The first switch 60 is interposed in the middle of the power supply circuit 42. The first switch 60 is a switch to electrically open and close the power supply circuit 42. Battery voltage is applied to the motor 48 when the first switch 60 is turned on. The power supply to the motor 48 is stopped when the first switch 60 is turned off. The controller 54 controls on and off of the first switch 60 through the first gate driver 56. Further, the circuit unit 50 has an electric braking circuit 64 that shorts the first terminal 48a and the second terminal 48b of the motor 48. The second switch 62 is interposed in the middle of the electric braking circuit 64. The controller 54 controls on and off of second switch 62 through second gate driver 58.

The first switch 60 is FET having a source, a drain and a gate. While the controller 54 applies gate-on voltage to the gate of the first switch 60 through the first gate driver 56, resistance between the source and the drain of the FET 60 is decreased. While the controller 54 does not apply the gate-on voltage to the gate of the first switch 60 through the first gate driver 56, the resistance between the source and the drain of FET 60 is increased. The motor 48 is energized while the main switch 44 is closed and the first switch 60 is turned on. On the other hand, the motor 48 is not energized while the main switch 44 is opened or the first switch 60 is turned off.

The second switch 62 is also a FET having a source, a drain and a gate. While the controller 54 applies the gate-on voltage to the gate of the second switch 62 through the second gate driver 58, a resistance between the source and the drain of FET 62 is decreased. While the controller 54 does not apply the gate-on voltage to the gate of the second switch 62 through the second gate driver 58, the resistance between the source and the drain of the FET 62 is increased. The motor 48 is not short circuited, and the motor 48 is energized while the second switch 62 is turned off. The motor 48 is short circuited while the second switch 62 is turned on. When the motor 48 is short circuited during rotation, braking force is applied to the motor 48 due to an electromagnetic effect.

In the normal operation, the first switch 60 is maintained in the on sate, and the second switch 62 is maintained in the off state. In the normal condition, the motor 48 is activated when the main switch 44 is closed and the electric braking does not work. When the detector 46 detects the movement of the hand guard 26, the first switch 60 is turned off and the second switch 62 is turned on. In this state, the motor 48 is not energized and the electric braking circuit 64 works. The motor 48 and the saw chain 16 stop very rapidly.

In this embodiment, the FET is used for the first switch 60 and the second switch 62. However, any types of switch may be adopted for the first switch 60 and the second switch 62. The switch having a contact may be adopted.

The regulator 52 supplies regulated voltage Vcc to the controller 54, the first gate driver 56 and the second gate driver 58. The controller 54 is formed by a microcomputer that operates by using the regulated voltage Vcc. The detector 46 is connected to the controller 54, and the controller 54 determines whether the detector 46 is in the on sate or the off state.

While the hand guard 26 is at its nominal position and the detector 46 is in the off state, the controller 54 receives positive voltage at port 54*a*. While the controller 54 receives the positive voltage at the port 54*a*, the controller 54 sends the gate-on voltage to the first gate driver 56 and the first switch 60 is turned on thereby, and the controller 54 sends the gate-off voltage to the second gate driver 58 and the second switch 62 is turned off thereby. In this condition, the motor 48 is energized while the main switch 44 is closed, and the electric braking circuit 64 does not work.

When the hand guard 26 is moved forwardly from its nominal position and the detector 46 shifts to the on state, the controller 54 receives ground voltage at the port 54*a*. While the controller 54 receives the ground voltage at the port 54*a*, the controller 54 sends the gate-off voltage to the first gate driver 56 and the first switch 60 is turned off thereby. Meanwhile, the controller 54 sends the gate-on voltage to the second gate driver 58 and the second switch 62 is turned on thereby. In this condition, the power supply to the motor 48 is stopped even if the main switch 44 is maintained in the closed state, and the electric braking circuit 64 starts working. When the hand guard 26 is moved forwardly from its nominal position, the traveling of the saw chain 16 is quickly stopped due to the electromagnetic braking, and the power supply to the motor 48 is stopped. The motor 46 is prevented from overheating.

According to this embodiment, the detector 46 does not directly cut off the power supply to the motor 48, instead, the detector 46 detects whether the hand guard 26 is at its normal position or moved forwardly from its normal position. The power lines 49*a*, 49*b*, 49*c*, 49*d*, and 49*e* do not reach the detector 46. Lengths of the power lines 49*a*, 49*b*, 49*c*, 49*d*, and 49*e* can be made shortened compared to the conventional electric circuit in which power lines are connected to a switch provided in the vicinity of the hand guard 26. The electric noise becomes large when the large electric current flows through the long power line. In this embodiment, the length of the power lines 49*a*, 49*b*, 49*c*, 49*d*, and 49*e* is made shorter; therefore, the electric noise is lowered. Only a small current flows through the connecting lines 47*a*, 47*b* between the controller 54 and the detector 46. The lines 47*a*, 47*b* reaching the detector 46 do not generate electric noise.

Figure 4:
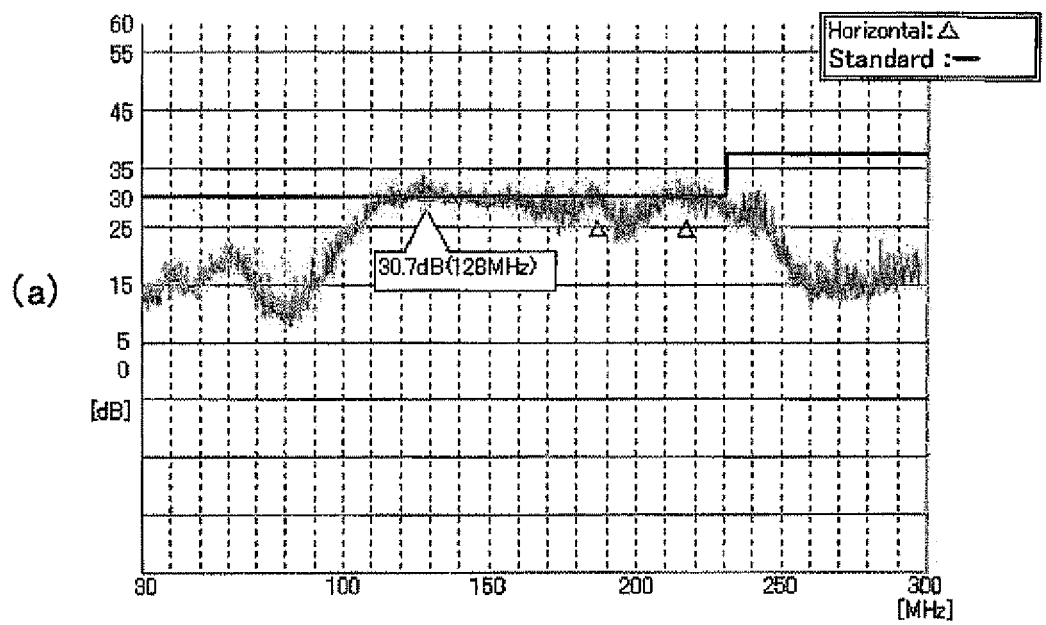
FIG. 4(a) shows electric noise level transmitted from the conventional chain saw.
FIG. 4(b) shows electric noise level transmitted from the chain saw of the first embodiment.
Figure 4:
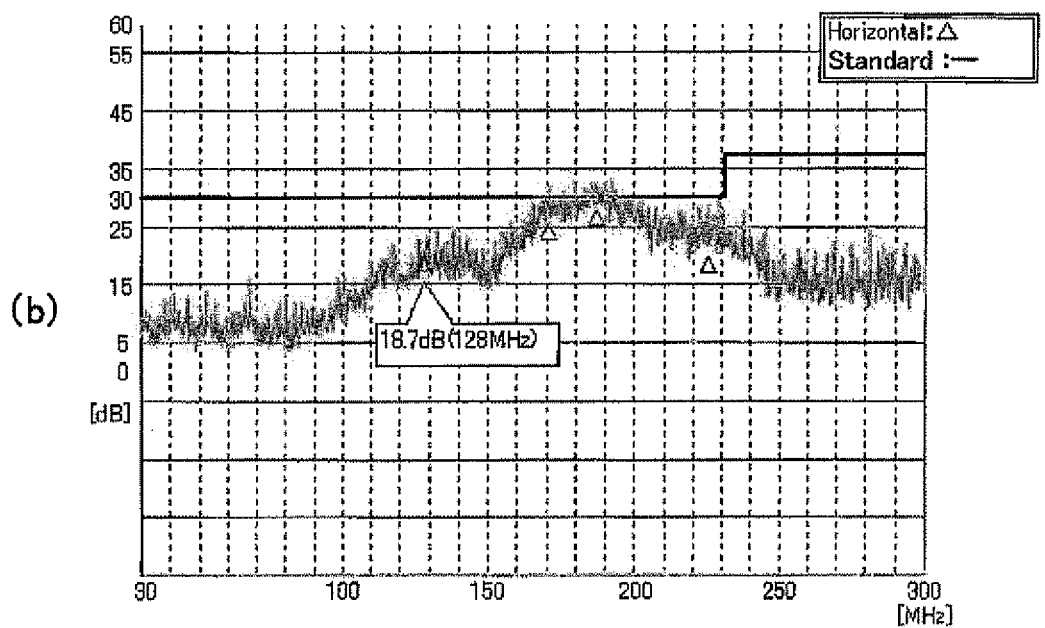

FIG. 4(*a*) shows a noise level generated by the conventional electric circuit, and FIG. 4(*b*) shows a noise level generated by the electric circuit of the embodiment. As clearly indicated by the two graphs, the noise level of the embodiment is effectively lowered at all frequencies. Specifically, the noise level between 80 to 180 MHz is substantially lowered by the embodiment. According to the embodiment, the requirements for the anti-noise measures are greatly reduced, and the chain saw 10 can be downsized. Manufacturing cost of the chain saw 10 is also lowered.

The detector 46 is separated from the power supply lines, therefore, a small switch or sensor may be adopted as the detector 46. The downsized detector 46 helps downsizing the entirety of the electric power tool. The electric lines 47*a*, 47*b* connected to the detector 46 may be thin electric wires. The thin electric wires 47*a*, 47*b* also help downsizing the entirety of the electric power tool.

(Embodiment 2)

Figure 5:
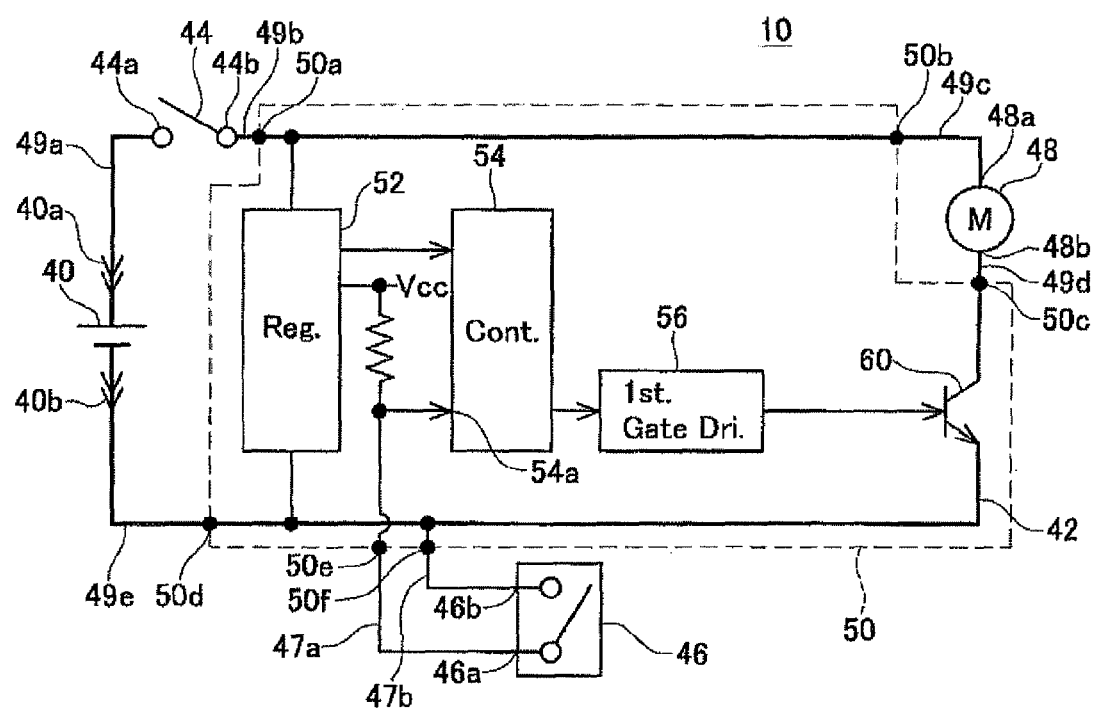
FIG. 5 shows an electric circuit of a chain saw of a second embodiment.

FIG. 5 shows an electric circuit of a second embodiment. In the second embodiment, the electric braking circuit 64 is omitted. When the mechanical braking device that is activated by the movement of the hand guard is provided, the electric braking circuit is not essential. On the other hand, in the first embodiment, since the electric braking circuit 64 is provided, the mechanical braking device that is activated by the movement of the hand guard can be omitted.

(Embodiment 3)

Figure 6:
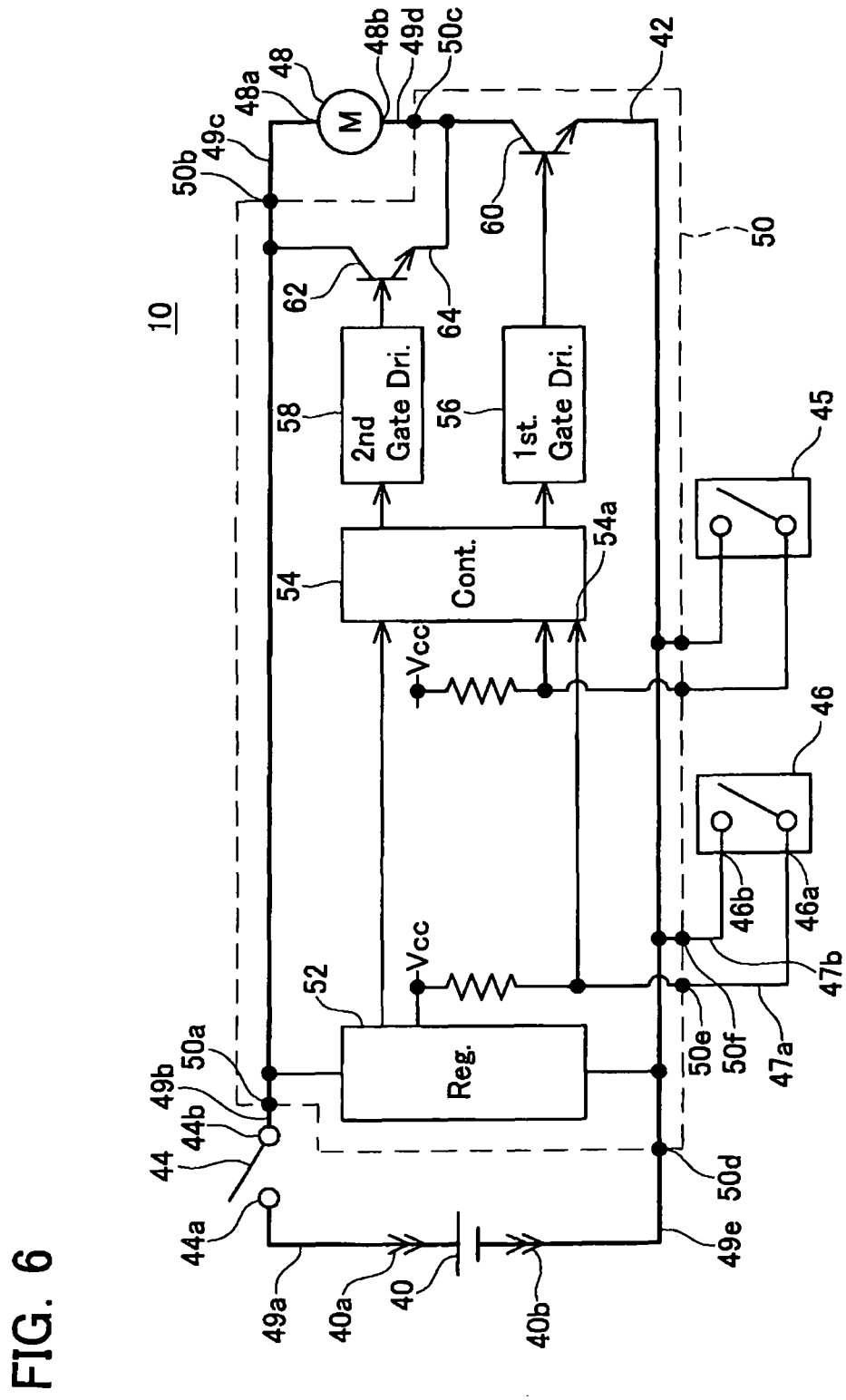
FIG. 6 shows an electric circuit of a chain saw of a third embodiment.

FIG. 6 shows an electric circuit of a third embodiment. In the third embodiment, the main switch 44 is separated from the power supply lines. Instead, the second detector 45 for monitoring whether the trigger 20 is pulled or not is provided in the vicinity of trigger 20. The controller 54 monitors whether the trigger 20 is pulled or not through the second detector 45. The controller 54 makes the first switch 60 to turn on and the second switch 62 to turn off while the trigger 20 is pulled and the hand guard 26 is at its normal position. The controller 54 makes the first switch 60 to turn off and the second switch 62 to turn on when the hand guard 26 is moved forwardly from its normal position even if the trigger 20 is being pulled or the trigger 20 is released; i.e., regardless of whether the trigger 20 is being pulled or released. The detector 46 outputs a first predetermined signal while the hand guard 26 is at it normal position, and outputs a third predetermined signal while the hand guard 26 is moved forwardly. The second detector 45 outputs a second predetermined signal while the trigger 20 is pulled, and outputs a fourth predetermined signal while the trigger 20 is released. The controller 54 is configured to control the first switch 60 so as to electrically close the power supply circuit 42 when the controller 54 receives the first predetermined signal from the detector 46 and the second predetermined signal from the second detector 45, and electrically opens the power supply circuit 42 when the controller 54 receives the third predetermined signal from the detector 46 or the fourth predetermined signal from the second detector 45.

According to this embodiment, the second detector 46 monitors whether the trigger 20 is pulled or not, and the controller 54 cuts off the power supply to the motor 48 by turning off the first switch 60. The power lines 49*a*, 49*b*, 49*c*, 49*d*, and 49*e* do not reach the second detector 46 disposed proximal to the trigger 20. Therefore, the lengths of the power lines 49*a*, 49*b*, 49*c*, 49*d*, and 49*e* are made shorter compared to the first and second embodiments in which the power lines are connected to the main switch disposed proximal to the trigger 20.

Further modification may be made to the aforesaid embodiments. For instance, the signal wires 47*a*, 47*b* connecting the controller 54 and the detector 46 may be electric wires, optical wires, mechanical wires or mechanical links. Reducing the use of the electric wires lowers the electric noise level.

What is claimed is:

1. An electric power tool comprising:
    a tool;
    a main body supporting the tool;
    an electric motor disposed in the main body and configured to drive the tool;
    a trigger supported by the main body and configured to be manually activated and deactivated by an operator;
    a power supply circuit electrically connected to the electric motor and configured to supply electric power to the electric motor;
    a movable member including a shaft supported by the main body and configured to rotate with respect to the main body around the shaft;
    a detector disposed in the main body and configured to detect a rotational movement of the movable member;
    a first switch disposed in the power supply circuit to electrically open and close the power supply circuit; and
    a controller electrically connected to the first switch and the detector and configured to control the first switch to:

(i) electrically close the power supply circuit when the trigger is activated, (ii) electrically open the power supply circuit when the trigger is deactivated, and (iii) electrically open the power supply circuit when the detector detects the movement of the movable member while the trigger is activated.

2. An electric power tool as in claim 1,
wherein the controller is configured to control the first switch to electrically open the power supply circuit when the controller receives a predetermined detection signal from the detector.

3. An electric power tool as in claim 2, wherein,
the detector is configured to output the predetermined detection signal when the movable member moves from a normal position.

4. An electric power tool as in claim 3, wherein,
the main body comprises a handle for an operator to hold, and
the movable member is arranged proximal to the handle and configured to move from the normal position by contacting the operator holding the handle.

5. An electric power tool as in claim 4, wherein,
the handle extends in a direction substantially perpendicular to a rotational direction of the tool.

6. An electric power tool as in claim 5, wherein,
the tool is a saw chain, and
the electric power tool is a chain saw.

7. An electric power tool as in claim 1, wherein,
the first switch comprises at least one semiconductor switch.

8. An electric power tool as in claim 1, wherein,
the first switch comprises at least one field effect transistor.

9. An electric power tool as in claim 1, further comprising:
a motor short circuit configured to electrically short terminals of the electric motor to brake the electric motor; and
a second switch disposed in the motor short circuit and configured to electrically open and close the motor short circuit,
wherein the controller is electrically connected to the second switch and configured to control the second switch to electrically close the motor short circuit when the detector detects the movement of the movable member.

10. An electric power tool as in claim 9, further comprising:
wherein the controller is configured to control the second switch so as to electrically close the motor short circuit when the controller receives a predetermined detection signal from the detector.

11. An electric power tool as in claim 9, wherein,
the second switch comprises at least one semiconductor switch.

12. An electric power tool as in claim 9, wherein,
the first switch comprises at least one field effect transistor.

13. An electric power tool as in claim 1, further comprising:
a second detector disposed in the main body to detect a movement of the trigger;
wherein the controller is electrically connected to the second detector and configured to control the first switch so as to electrically close the power supply circuit when the controller receives a first predetermined signal from the detector and a second predetermined signal from the second detector, and electrically open the power supply circuit when the controller receives a third predetermined signal from the detector or a fourth predetermined signal from the second detector.

14. An electric power tool as in claim 1, wherein
the detector is configured to output a first predetermined signal when the movable member is positioned at a normal position and quit outputting the first predetermined signal when the movable member moves from the normal position, and
the controller is configured to control the first switch to electrically open the power supply circuit when the detector quits outputting the first predetermined signal.

15. An electric power tool as in claim 14, further comprising
a second detector disposed in the main body and configured to output a second predetermined signal when the trigger is activated and quit outputting the second predetermined signal when the trigger is deactivated, wherein
the controller is electrically connected to the second detector and configured to control the first switch to electrically close the power supply circuit only when the controller receives both the first predetermined signal and the second predetermined signal.

* * * * *